UNITED STATES PATENT OFFICE.

HENRY W. BRADLEY, OF NEW BERLIN, ASSIGNOR TO HIMSELF AND B. VAN HORN, OF BENNETTSVILLE, NEW YORK.

IMPROVEMENT IN PAINT.

Specification forming part of Letters Patent No. 62,598, dated March 5, 1867.

*To all whom it may concern:*

Be it known that I, HENRY W. BRADLEY, of New Berlin, in the county of Chenango and State of New York, have invented a new and Improved Paint; and I do hereby declare that the following is a full, clear, and exact description thereof, which will enable others skilled in the art to make and use the same.

This invention relates to a new composition for paint, whereby a very cheap, consistent, and glossy paint is manufactured, and one which will dry faster than the ordinary paints generally do.

The invention consists in the application of such ingredients to common oil-paint that water may be readily mixed with such paint, thereby reducing the expense of the article and adding to its quality, as by the use of the water the paint will dry quick.

My paint is composed of the following ingredients, and in about the following proportions, in one hundred and twenty-five parts of weight: Sugar of lead, (acetate of lead,) one part; water, thirty-two parts; boiled oil, thirty-two parts; mineral paint of any kind, sixty parts—in all, one hundred and twenty-five parts.

The sugar of lead or its equivalent, sulphate of zinc, is mixed with the water, by which it is readily dissolved. The oil is then added to the solution, and then the color is mixed with these in the ordinary way.

The oil-paint mixes readily with the water after the acetate of lead has been dissolved in the latter; and thus I am saving half the oil otherwise needed for the same quantity of paint. The water adds to the bulk or consistency of the paint.

This paint is very easily applied. In cans it will not settle. It will be glossy, making the articles painted look as if they were varnished. It will stand longer when applied and exposed to the atmospheric air than the paints now generally used.

All kinds and shades of mineral or vegetable colors or dyes can be mixed with oil, water, and acetate of lead, in the manner and in the proportions heretofore set forth.

The above proportions may be varied slightly, so as to produce paints of different quality for different purposes. Instead of the sixty parts of oil I can substitute a mixture of boiled-rice vehicle, which has previously to be dissolved in water with eight parts of oil. The four parts of glue answer the same purpose as twenty-four parts of oil; thus the cost of the paint is still further reduced.

Having thus described my invention, I claim as new, and desire to secure by Letters Patent—

1. As an improved article of manufacture, a paint compound which is composed of the ingredients, or their respective equivalents, and in the proportions herein set forth.

2. The substitution, for a certain quantity of oil in paints, of boiled rice, substantially as and for the purpose herein set forth.

The above specification of my invention signed by me this 10th day of November, 1866.

HENRY W. BRADLEY.

Witnesses:
WM. F. MCNAMARA,
ALEX. F. ROBERTS.